No. 765,185. PATENTED JULY 19, 1904.
B. G. LAMME.
CONTROLLING APPARATUS FOR ELECTRICALLY PROPELLED RAILWAY VEHICLES.
APPLICATION FILED SEPT. 29, 1902.
NO MODEL.
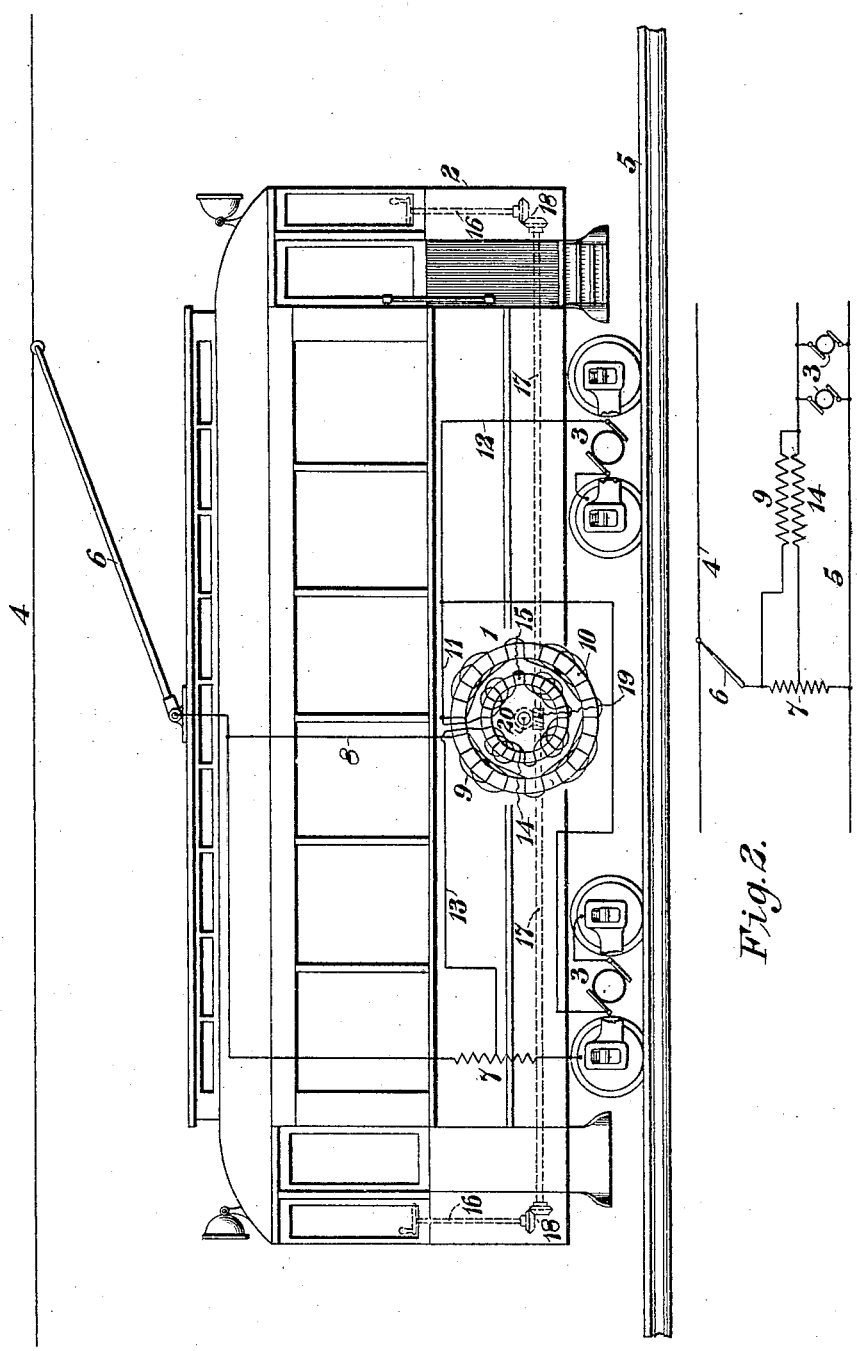
WITNESSES:
C. L. Belcher
Birney Hines
INVENTOR
Benjamin G. Lamme
BY
Wesley G. Carr
ATTORNEY.

No. 765,185.	Patented July 19, 1904.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

CONTROLLING APPARATUS FOR ELECTRICALLY-PROPELLED RAILWAY-VEHICLES.

SPECIFICATION forming part of Letters Patent No. 765,185, dated July 19, 1904.

Application filed September 29, 1902. Serial No. 125,226. (No model.)

*To all whom it may concern:*

Be it known that I, BENJAMIN G. LAMME, a citizen of the United States, and a resident of Pittsburg, in the county of Allegheny and State of Pennsylvania, have invented a new and useful Improvement in Controlling Apparatus for Electrically - Propelled Railway-Vehicles, of which the following is a specification.

My invention relates to the propulsion and control of vehicles operated by electric motors, and particularly to such as are operated by single-phase alternating-current motors; and it has for its object to provide a means for facilitating speed control and also for minimizing the strains exerted upon the controlling apparatus by variations in voltage.

In Patent No. 758,667, granted May 3, 1904, to Westinghouse Electric & Manufacturing Company upon an application filed by me, is set forth a motor designed and adapted for operation by single-phase alternating-current energy, and it is to systems embodying motors of this character that my present invention pertains.

In Figure 1 of the accompanying drawings I have illustrated a railway-vehicle equipped with propelling and controlling mechanism in accordance with my invention, such mechanism being, however, diagrammatically illustrated. In Fig. 2 I have shown a simplified diagram of the electrical features illustrated in Fig. 1.

Satisfactory utilization of single-phase alternating-current energy for the production of mechanical power at variable speeds involves certain special structural characteristics of the motors employed which are fully set forth in the patent above referred to; but since my present invention is not directly concerned with the motor construction it is deemed unnecessary to enter into a detailed statement with reference thereto, it being sufficient to state that the motors are constructed and designed to operate efficiently at variable speeds when supplied with single-phase alternating - current energy of variable voltage.

My invention has to do more particularly with the means for varying the voltage supplied to such motors, and such voltage variation may be obtained either by varying the active length of one of the windings of a transformer the secondary of which is connected to the motor-circuit and the primary of which is connected either directly or indirectly to the supply or trolley circuit, or it may be effected by mechanical adjustment of the two members of the transformer, the one with reference to the other, so as to effect an inductional variation in voltage, or the two may be combined, if desired.

I have here illustrated the inductional form of voltage - regulator, which, as well as the other forms just referred to, is structurally well known in the art and which is diagrammatically illustrated at 1, it being supported in a suitable manner and in a suitable position on the vehicle 2, which is propelled by motors 3, here shown as two in number. It is to be understood, however, that a greater number of motors may be employed, and, in fact, where large vehicles are employed and it is desired to operate at high speeds it will probably be found advantageous to employ at least four motors.

The current for operating the motors 3 is derived from a supply-circuit carrying single-phase current, one side of which is here indicated as an overhead trolley-wire 4 and the other side as the track-rails 5. It is of course to be understood that the supply-conductors may both be located either above or below the vehicle and that if located below they may be either surface conductors or inclosed in suitable conduits.

The current from the conductor 4 passes through the trolley 6 to one terminal of an autotransformer 7, the other terminal of which may be connected to the other conductor 5 of the circuit in the usual manner. Current from the conductor 4 also passes by the trolley 6 and a conductor 8 to one terminal of the winding 9 of the stationary member 10 of the regulator 1, the other terminal of the winding 9 being connected to the motors 3 by conductors 11 and 12, so that they are supplied in parallel, series connection of the motors being, however, within the scope of my invention.

An intermediate point in the winding of the autotransformer 7 is connected by a conductor 13 to one terminal of the winding 14 of the secondary member 15 of the voltage-regulator 1, and the other terminal of this winding is connected, by means of conductors 11 and 12, to the motors 3.

The member 15 of the regulator 1 may be rotated to inductionally effect the desired voltage regulation or adjustment by any suitable means, that which is indicated for illustrative purposes only comprising vertical shafts 16, directly operated by the motorman, horizontal shafts 17, bevel-gears 18 connecting the two shafts and worm-gearing 19 between the shafts 17 and the shaft 20 of the motor 15.

It will be clearly understood by those skilled in the art without detailed description that rotation of the member 15 in one direction from a given position with relation to the member 10 will serve to raise the voltage of the motor-circuit and that rotation in the other direction will serve to lower such voltage.

The special arrangement of circuits, which constitutes my present invention, may be clearly seen by reference to Fig 2—that is to say, the winding 9 of the voltage-regulator is connected directly across from the trolley or supply circuit to the motor-circuit, so as to bridge both the autotransformer 7 and the winding 14 of the other member of the regulator. By reason of this arrangement of circuits when the voltages supplied to the motors exceed that represented by the point of connection between the conductor 13 and the winding 7—i. e., when the voltages correspond to running speeds—a portion of the current taken by the motors flows directly through the primary winding 9 in shunt to the secondary of the regulator and to the transformer 7, thus relieving the said windings to that extent, and consequently permitting the regulator to work at a relatively low degree of induction and at a reduced current.

When the motors are supplied with relatively low voltages to obtain proper starting and accelerating speeds, the secondary winding of the regulator does a larger share of the work of voltage variation, and the regulator is worked at materially higher degrees of induction. It follows, therefore, that the regulator operates for only brief periods at high degrees of induction, that the average losses will be much less than with the usual arrangement of circuits, and that the combination is therefore particularly well adapted for continuous service.

I make no claim herein, broadly, to either a system or a method of control for single-phase alternating-current motors by varying the applied voltage in accordance with the speed desired, but have made such broad inventions the subjects-matter of other applications, filed August 3, 1903, and respectively bearing Serial Nos. 168,061 and 168,062.

I claim as my invention—

1. In a controlling apparatus for single-phase alternating-current motors, the combination with a supply-circuit, one or more motors, and a transformer between the supply-circuit and the motor-circuit, of an induction-regulator for varying the voltage supplied to the motor or motors the primary winding of which has its terminals respectively connected to the supply-conductor and to the motor-circuit between the motors and the secondary winding of the regulator.

2. The combination with one or more single-phase translating devices and a source of energy for operating the same, of an autotransformer interposed between said source and said translating devices and an induction-voltage regulator having its primary winding connected in shunt to its secondary winding and to a portion of the autotransformer-winding.

3. The combination with a single-phase alternating-current supply-circuit and one or more suitable translating devices, of an autotransformer connected across said supply-circuit and an induction-regulator having its secondary winding connected between an intermediate point in said autotransformer-winding and said translating device or devices and having its primary winding connected in shunt to its secondary winding and one portion of the autotransformer-winding.

4. The combination with a single-phase alternating-current supply-circuit and one or more motors, of an autotransformer interposed between said supply-circuit and said motors and an induction-regulator having its secondary winding connected between an intermediate point in said autotransformer-winding and said motor or motors and having its primary winding connected in shunt to its secondary winding.

In testimony whereof I have hereunto subscribed my name this 25th day of September, 1902.

BENJ. G. LAMME.

Witnesses:
JAMES B. YOUNG,
BIRNEY HINES.